United States Patent [19]
Wylie

[11] Patent Number: 5,236,215
[45] Date of Patent: Aug. 17, 1993

[54] TRAILER HITCH COUPLING GUIDE

[76] Inventor: Thomas S. Wylie, P.O. Box 545, Holliday, Tex. 76366

[21] Appl. No.: 914,316

[22] Filed: Jul. 17, 1992

[51] Int. Cl.$^5$ .............................................. B60D 1/36
[52] U.S. Cl. .................................... 280/477; 280/508; 280/507
[58] Field of Search ............ 280/477, 508, 511, 479.2, 280/479.3, 507

[56] References Cited

U.S. PATENT DOCUMENTS

| | | | |
|---|---|---|---|
| 3,420,549 | 1/1969 | Robinson | 280/477 |
| 3,879,062 | 4/1975 | Miller | 280/477 |
| 4,254,968 | 3/1981 | DelVecchio | 280/477 |
| 4,781,394 | 11/1988 | Schwarz et al. | 280/477 |
| 4,840,392 | 6/1989 | Baskett | 280/477 |
| 4,854,604 | 8/1989 | Stallsworth | 280/477 |
| 4,871,185 | 10/1989 | Chakroff et al. | 280/477 |
| 4,974,866 | 12/1990 | Morgan | 280/477 |

Primary Examiner—Margaret A. Focarino
Assistant Examiner—Carla Mattix
Attorney, Agent, or Firm—Norman B. Rainer

[57] ABSTRACT

A device for assisting in the alignment of the coupling socket of a trailer with the ball of a bumper trailer hitch utilizes paired horizontally disposed elongated bars having a parallel region and rearwardly directed funnel-shaped divergent portion. An upwardly directed guidepost is positioned upon the trailer above the socket. The bars are supported by downwardly directed posts in a manner to permit their removability when not in use or storage in a configuration closely adjacent the bumper.

4 Claims, 2 Drawing Sheets

TRAILER HITCH COUPLING GUIDE

DISCLOSURE DOCUMENT

This invention is the subject of Disclosure Document No. 296,456, dated Nov. 22, 1991.

BACKGROUND OF THE INVENTION

1. Field of the Invention

This invention relates to devices for facilitating the hitching of a trailer to the draw bar of a towing vehicle, and more particularly concerns an easily removable and adjustable guide for directing a hitch member mounted on the forward end of a trailer into alignment above a hitch ball mounted on the draw bar.

2. Description of the Prior Art

The connection or "hitching" of a towing vehicle to a trailer such as those commonly used for carrying boats, campers and the like, requires that the towing vehicle, having a coupling ball, be backed toward the trailer in a manner causing proper juxtaposition of the ball with a receiving socket on the fore portion or "tongue" of the trailer. For convenience, a caster support wheel is often downwardly directed from the tongue of the trailer in order to raise the tongue higher than the level of the ball. The towing vehicle may then be backed up until the ball is near alignment below the receiving socket. Since the driver of the vehicle is unable to see either the trailer tongue or the hitch ball when backing toward the trailer, it is nearly impossible to align the trailer tongue above the hitch ball during backing of the vehicle. Furthermore, a substantial danger exists that the vehicle will be backed too far, resulting in damage to the rear of the towing vehicle.

This problem is conventionally solved by utilizing a second person to signal to the driver. Without the second person, however, it is necessary for the driver to back up a small distance, get out of the vehicle to inspect the relative positions of the ball and the socket, and return to the vehicle, often repeating this sequence several times. When the ball and socket are aligned, the supporting caster wheel is raised to cause a lowering of the tongue socket onto the ball.

A desirable solution to this problem is to provide a V-shaped guide about and slightly above the ball and mounted to the vehicle. Such guides are shown in U.S. Pat. Nos. 3,420,549 to Robinson; 4,974,866 to Morgan, and 4,254,968 to DelVecchio.

Such prior art guides, however, suffer from a variety of shortcomings. For example, in order for the guide to be effective, any elongated arms which guide the socket to a position above the ball must extend sufficiently aft of the vehicle that they intercept a misaligned tongue and guide it laterally to the center of the vehicle where the ball is located. However, if the arms extend sufficiently to be effective as guides, they interfere with the articulation between the vehicle and the tongue by striking the tongue when the vehicle makes a sharp turn or when backing. This can cause severe damage to the guide, the hitch, the trailer, or the towing vehicle.

The Robinson device attempts to solve this problem by providing pivotable arms. However, these arms require manual manipulation and fastening in their outwardly extended position and, furthermore, require a large unsightly structure on the back of the towing vehicle which is undesirable when the vehicle is used without towing. Additionally, it requires moving parts which are subject to wear, corrosion and malfunction.

The DelVecchio and Morgan guides may be removed from the vehicle, however, the process requires un-bolting which may necessitate the use of hand tools, and could be an unpleasant chore, especially in cold weather.

Devices having fixed guides are disclosed in U.S. Pat. Nos. 3,773,356 and 4,226,438. However, such fixed guides not only provide permanent, unslightly attachment to the rear of a vehicle, but require a trade-off between making the arms extend sufficiently long to be effective and yet sufficiently short as not to interfere with articulation between vehicle and trailer.

If the towing vehicle is backed with excessive force against the trailer tongue, the arms or other portions of the device may become bent, and no longer useable. Over a period of time, normal friction between the trailer tongue and the guide means will deleteriously effect the tongue and guide means.

Although ball-type trailer hitches all operate on the same principle, they come in a variety of sizes. The draw bars also come in a variety of configurations, and may be mounted upon variously-sized step bumpers as generally employed on pickup trucks.

It would be desirable to have a single, universal guide unit mountable to any towing vehicle having a hitch of the ball type. The installation of some hitch guides requires significant modification to the towing vehicle, such as by welding additional supports onto the draw bar. Such modification is expensive, and results in a permanent attachment which cannot conveniently be removed, for example when selling the towing vehicle.

U.S. Pat. No. 4,871,185 to Chakroff et. al. attempts to address the problems of adaptability and removability. However, it is based upon the central premiss that the ball which is mounted upon the draw bar has a downwardly directed bolt which may penetrate an aperture in the mounting plate of the guide means. One commonly used trailer hitch utilizes an extended draw bar which slidably and securably engages a rearwardly directed length of square tubing. In this configuration, the ball is invariably welded upon a post which is upwardly emergent from the draw bar extension. The Chakroff device could not be used with such a towing hitch.

It is therefore an object of the present invention to provide a hitching guide which will effectively guide the ball of a trailer hitch into underlying juxtaposition with the socket of a trailer tongue so that they will engage when the tongue of the trailer is lowered.

It is another object of the present invention to provide a hitching guide of the aforesaid nature which may be retracted from the guiding position while towing or in normal operation of the vehicle.

It is still another object of this invention to provide a hitching guide of the aforesaid nature which may be easily removed without the use of tools.

Further objects of the present invention are to provide a hitching guide of the aforesaid nature which is amenable to low cost manufacture, may be utilized with a multitude of hitch arrangements, and will not cause damage or wear to the trailer tongue.

These and other beneficial objects and advantages will be apparent from the following description.

SUMMARY OF THE INVENTION

The above and other beneficial objects and advantages are accomplished in accordance with the present invention by a trailer hitching guide adapted for use with a vehicle having a standard rear step-bumper and draw bar trailer hitch, said step bumper having a recessed hitching region bounded in part by a horizontally disposed flat surface having a central hitching aperture, said draw bar extending rearwardly from and below said bumper along the longitudinal axis of said vehicle and terminating in a rear extremity having an upwardly directed, substantially spherical hitch ball adapted to couple to a standard trailer tongue receiving socket, said hitching guide comprised of:

a) a mounting plate adapted to be affixed upon said flat surface, said plate having attachment means to permit securement to said flat surface, and paired mounting tubes upwardly emergent from said mounting plate in equally spaced opposition about said longitudinal axis, b) a mounting yoke configured to embrace said draw bar and having paired vertically disposed first securing bores disposed in rectangular array with said mounting tubes, c) paired arms horizontally emergent from said mounting plate and diverging to rearwardly disposed distal extremities having vertically disposed auxiliary securing bores, d) paired horizontally disposed elongated guide bars having parallel portions extending between forward and rearward extremities, rearwardly directed divergent portions emergent from said rearward extremities, downwardly directed forward mounting posts associated with said forward extremities and adapted to reside within said mounting tubes, and rear mounting posts downwardly directed from said parallel portions and adapted to reside within said first securing bores, and e) a vertical guide post configured to be vertically mounted above said receiving socket and adapted to slide between said guide bars, whereby, 1) when said vehicle is backed-up, said guide post is engaged between said divergent portions and directed between said parallel portions into overlying juxtaposition with said ball, permitting said receiving socket to be lowered onto said ball, and 2) said guide bars may be removed from said first securing bores and mounting tubes, or alternatively, 3) said rear mounting posts may be inserted into said auxiliary securing bores, thereby positioning said guide bars for storage adjacent said bumper.

In a preferred embodiment, brace means may extend between said mounting plate and said yoke. In an alternative embodiment, the hitching guide may incorporate a rearwardly extending tubular sleeve adapted to accept the draw bar. In such embodiments, the yoke embraces the sleeve rather than the draw bar directly, thereby permitting easy removal of said draw bar.

The mounting plate may be fastened to the bumper by means of bolts penetrating apertures in the bumper and mounting plate. The device is preferably fabricated from mild steel and may be galvanized or painted to prevent corrosion.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
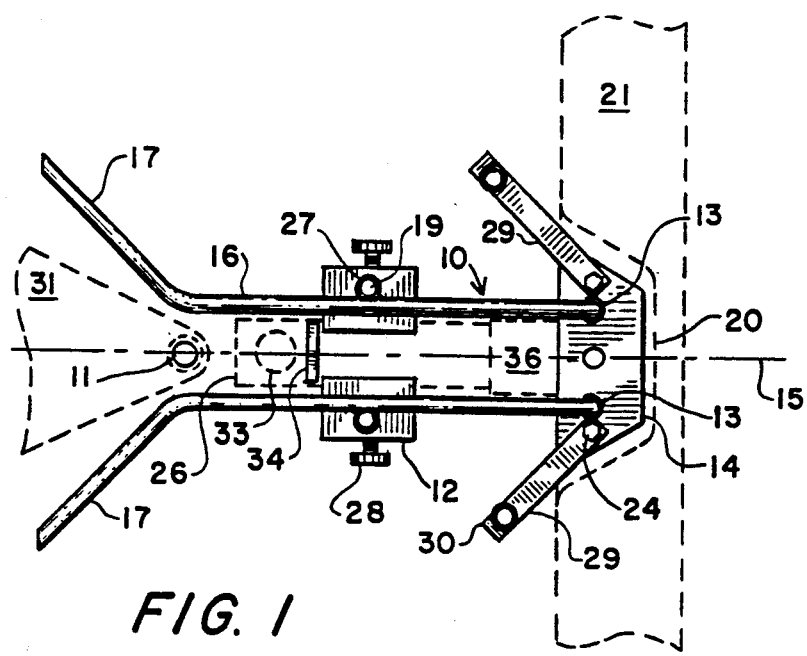
FIG. 1 is a top view of an embodiment of the hitching guide of the present invention in its deployed or hitching state and shown in association with a vehicle bumper and trailer tongue.
Figure 2:
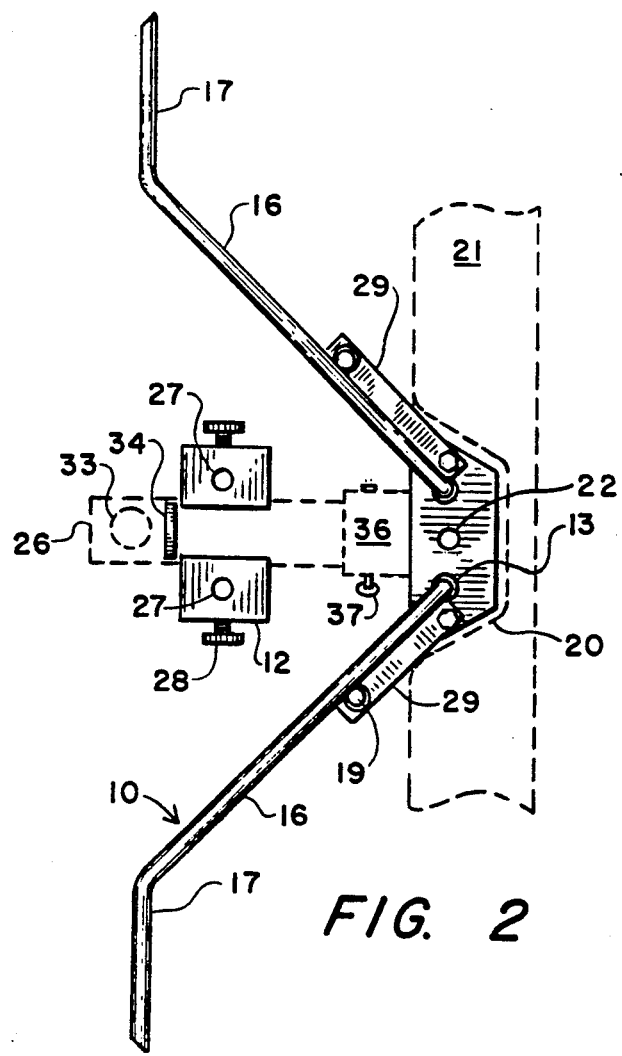
FIG. 2 is a top view of the embodiment of FIG. 1 shown in its storage state.
Figure 3:
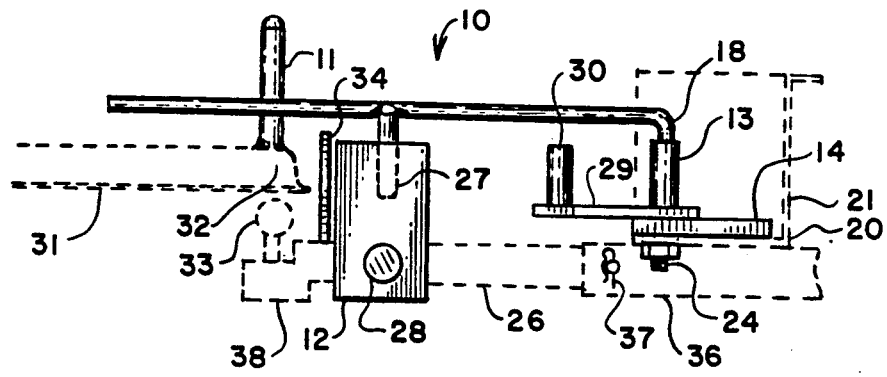
FIG. 3 is a side view of the embodiment of FIG. 1.
Figure 4:
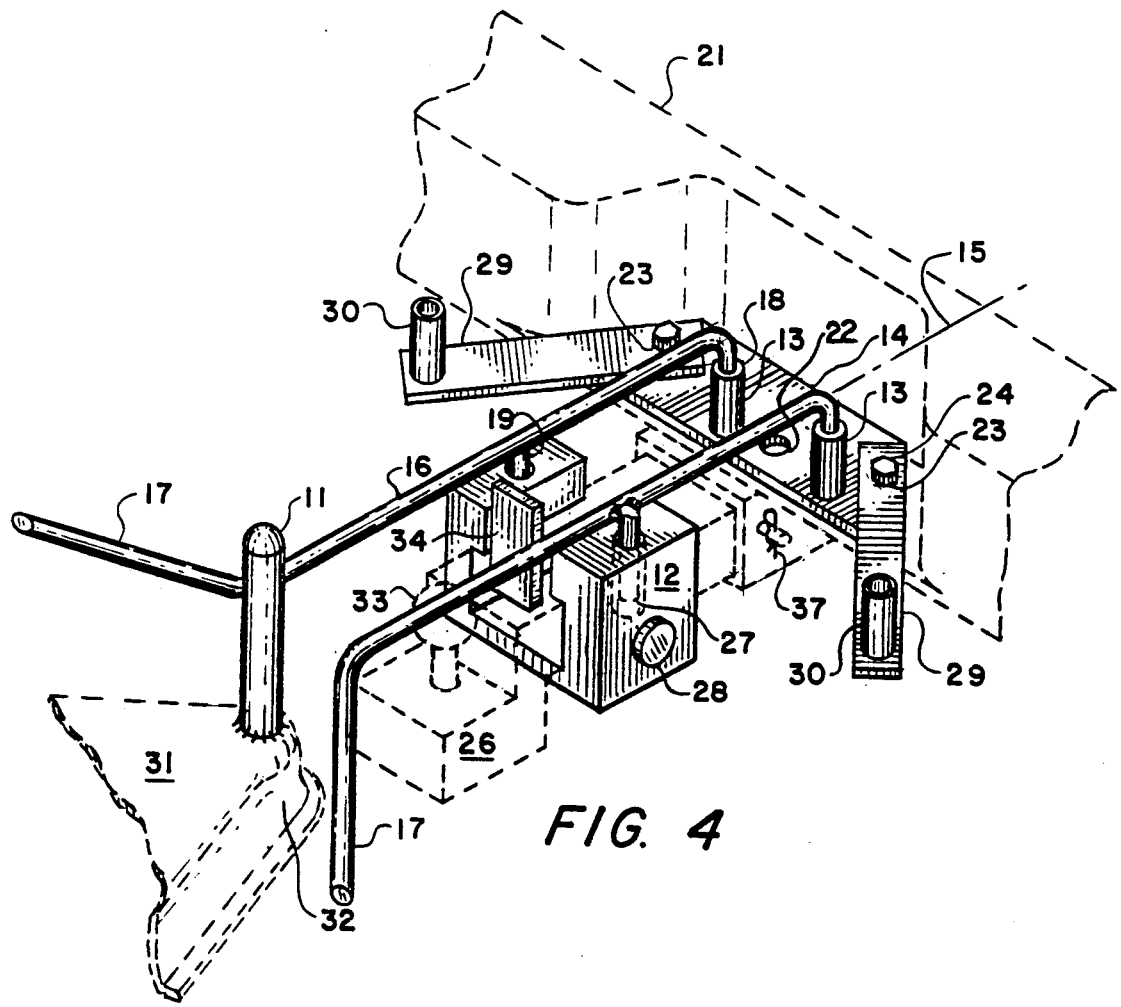
FIG. 4 is a perspective view of the embodiment of FIG. 1.

Referring to FIGS. 1-4, an embodiment of the hitching guide of the present invention is shown comprised of guide bars 10 supported by yoke 12 and paired mounting tubes 13 vertically positioned upon mounting plate 14.

Guide bars 10 are disposed in a horizontal plane in symmetrical relationship about a center axis 15 which further represents the center axis of a towing vehicle. The bars may be fabricated of strong metal or plastic and may be of rod or tubular construction. Although bars 10 are preferably constructed of round stock, other extruded shapes may be employed.

Guide bars 10 are comprised of a parallel section 16 and rearwardly and outwardly divergent section 17. The forward extremities of the parallel section are provided with downwardly directed forward mounting posts 18. Said posts may be formed by bending, thereby representing continuous integral extensions of said guide bars. Alternatively, posts 18 may be attached to said bars as by welding. The lengths of the parallel and divergent sections are substantially equal. Vertically oriented rear mounting posts 19 are downwardly directed from guide bars 10 at sites located about mid-length of said parallel section.

Mounting plate 14 is configured to fit upon horizontally disposed flat surface 20 recessed into bumper 21. The plate has attachment means in the form of central mounting aperture 22 which aligns with a standard aperture in surface 20. Side apertures 23 may be present in plate 14 to further facilitate attachment to surface 20. Threaded bolts 24 penetrate said mounting apertures to secure said plate 14 to surface 20.

Said paired mounting tubes 13 are welded to plate 14 and directed vertically upward therefrom. Said tubes are equally spaced about axis 15, and have a circular cylindrical interior adapted to receive mounting posts 18 in close-fitting sliding engagement.

A conventional draw bar 26 is shown telescopically emergent from holding tube 36 welded to the underside of bumper 21 along axis 15. Draw bar 26, secured within tube 36 by locking pin 37, extends rearwardly to step-down distal extremity 38 which supports mounting ball 33.

Yoke 12 is removably and adjustably secured to draw bar 26 by means of locking bolt 28. Paired, vertically disposed first securing bores 27 are disposed within yoke 12, and positioned to form a substantially rectangular array with mounting tubes 13. The diameter and shape of bores 27 are such as to receive rear mounting posts 19 in close sliding engagement.

Paired arms 29 are welded to plate 14 and are divergently directed rearwardly in a horizontal plane. Auxiliary securing bores, in the form of vertically disposed circular cylindrical tubes 30, are welded to the distal extremities of said arms.

Vertical guide post 11 is attached to trailer tongue 31 above coupling socket 32. Said post 11 may be attached either by welding or by removable clamping means. In the illustrated embodiment, stop means in the form of plate 34 is vertically emergent from draw bar 26. In alternative embodiments, yoke 12 may serve as the stop means.

In use, when the towing vehicle is backed rearwardly toward the trailer hitch, guide post 11 initially enters divergent portion 17 of guide bars 10, and then proceeds within parallel portion 16 until trailer tongue 31 contacts plate 34, placing socket 32 in overlying juxtaposition with ball 33. After coupling is achieved, guide bars 10 may be removed by lifting upwardly. Alternatively, the guide bars may be stored by reinserting forward mounting posts 18 into mounting tubes 13, and inserting rear mounting posts 19 into auxiliary securing bores 30. In such storage position, the guide bars lie close to the bumper, and will not contact the trailer during turning movements of the towing vehicle.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A trailer hitching guide adapted for use with a vehicle having a standard rear step-bumper and draw bar trailer hitch, said step bumper having a recessed hitching region bounded in part by a horizontally disposed flat surface having a central hitching aperture, said draw bar extending rearwardly from and below said bumper along the longitudinal axis of said vehicle and terminating in a rear extremity having an upwardly directed, substantially spherical hitch ball adapted to couple to a standard trailer tongue receiving socket, said hitching guide comprised of:

a) a mounting plate configured to be affixed upon said flat surface, said plate having attachment means to permit securement to said flat surface, and paired mounting tubes upwardly emergent from said mounting plate in equally spaced opposition about said longitudinal axis, b) a mounting yoke configured to embrace said draw bar and having paired vertically disposed first securing bores disposed in rectangular array with said mounting tubes, c) paired horizontally disposed elongated guide bars having paired parallel portions terminating in forward and rearward extremities, rearwardly directed paired divergent portions emergent from said rearward extremities, downwardly directed forward mounting posts associated with said forward extremities and adapted to reside within said mounting tubes, and rear mounting posts downwardly directed from said parallel portions and adapted to reside within said first securing bores, and d) a vertical guide post configured to be vertically mounted above said receiving socket and adapted to slide between said guide bars, whereby, when said vehicle is backed-up, said guide post is engaged between said divergent portions and directed between said parallel portions into overlying juxtaposition with said ball, permitting said receiving socket to be lowered onto said ball, and permitting said guide bars to be removed from said first securing bores and mounting tubes.

2. The hitching guide of claim 1 further comprising stop means configured to be associated with said draw bar.

3. The hitching guide of claim 1 wherein said yoke is configured to be removably and adjustably attached to said draw bar.

4. The hitching guide of claim 1 wherein said attachment means is an aperture in said plate positioned to align with a standard pre-existing aperture in said bumper.

* * * * *